Nov. 3, 1959  W. P. MANSFIELD  2,910,826
TURBO-CHARGED INTERNAL COMBUSTION ENGINES
Filed Nov. 9, 1953  5 Sheets-Sheet 1

Inventor:
Wilfred Percival Mansfield
by
Attorney

Nov. 3, 1959 W. P. MANSFIELD 2,910,826
TURBO-CHARGED INTERNAL COMBUSTION ENGINES
Filed Nov. 9, 1953 5 Sheets-Sheet 2

Inventor:
Wilfred Percival Mansfield
by
Attorney

Inventor:
Wilfred Percival Mansfield
by
Attorney

United States Patent Office 2,910,826
Patented Nov. 3, 1959

2,910,826

TURBO-CHARGED INTERNAL COMBUSTION ENGINES

Wilfred Percival Mansfield, Slough, England, assignor, by mesne assignments, to The British Internal Combustion Engine Research Association, Slough, England Application November 9, 1953, Serial No. 390,943

Claims priority, application Great Britain November 11, 1952

3 Claims. (Cl. 60—13)

The invention relates to an internal combustion engine comprising a cylinder, a piston in said cylinder, orifices in the cylinder for the entry and exit of gases into and out of the cylinder, and more particularly to the combination of an exhaust gas driven pressure charger that delivers charge to the cylinder at a pressure and in a quantity per cycle which is dependent upon the load and speed of the engine, with controlling members adapted to open and close the said orifice at non-varying points in the cycle of operations, which ensure that the volume of charge at substantially the pressure of supply which is present in the cylinder when all the orifices are closed is substantially constant and is considerably less than the total volume of the cylinder, such adaptation of the controlling members having the result that the effective volumetric compression ratio and effective compression stroke are considerably less than the volumetric expansion ratio and the expansion stroke respectively, the effective compression stroke and the expansion stroke being substantially constant and with means for automatically varying the compression and expansion ratios by varying the volume of the clearance space in the cylinder directly in accordance with variations in the maximum gas pressure in the cylinder in order to maintain the latter substantially constant over a wide load and speed range of the engine, said combination giving the result that for every variation of load and speed the compression ratio is varied by a lesser amount than the expansion ratio while the compression ratio and effective stroke are maintained less than the expansion ratio and stroke.

The timing of the orifice controlling members may ensure that on the induction stroke the entry of charge in to the cylinder is stopped by the closure of the inlet, or any special orifice that may be open, when the piston still has some considerable distance to travel to reach the end of its stroke, whereby the charge is expanded within the cylinder before being re-compressed during the compression stroke, or alternatively may ensure on the compression stroke the latest closing orifice in the cylinder is closed after the piston has travelled some considerable distance along the stroke, whereby some of the charge which was in the cylinder when the piston was at its position furthest away from the clearance space, is displaced back out of the cylinder. In this way the volume of charge retained in the cylinder to be compressed and to take part in the combustion process is substantially constant and is considerably less than the total volume of the cylinder. The closure of the last orifice to close is arranged to occur when the piston is adjacent its mid stroke position. It will be understood that the two arrangements described give the same result, since in the first case the charge expanded within the cylinder and re-compressed reaches the same pressure and temperature at the equivalent point on the compression stroke, as the charge introduced into the cylinder in the manner described in the second case.

This control arrangement also ensures that the effective volumetric compression ratio and the effective compression stroke, the latter effectively commencing at the point in the cycle when all the orifices are closed, are considerably less than the volumetric expansion ratio and expansion stroke, respectively.

The means for automatically varying the compression and expansion ratios by varying the volume of the clearance space in the cylinder directly in accordance with variations in the maximum gas pressure in the cylinder, may be, for example, a piston constructed and arranged in accordance with my Patent No. 2,742,027.

The combination of features described form a true combination, in that the employment of each feature extends the range of employment of the other features, and gives an improved result which is greater than the sum of the improved results obtained by the separate employment of the individual features.

The employment of less than a cylinder volume of charge permits the means for varying the clearance volume to operate over a wider range of compression and expansion ratios than would be possible if a full cylinder volume of charge was used, in that the reduced volume of charge is compressed into and expanded from a variable clearance volume.

Similarly, the employment of means for varying the clearance volume permits the volume of charge used, which may be at high pressure, to be reduced below that permissible with a fixed clearance volume, because the means for varying the clearance volume will ensure that the smaller volume of charge is compressed and expanded through a wider range of ratios. At starting and low load operation of the engine, the low pressure charge is compressed through a large compression ratio and the clearance volume is small, thus ensuring good combustion, while at high load the high pressure charge is compressed through a low pressure ratio and the clearance volume is large, thus avoiding excessive maximum pressures.

Moreover, the combination ensures that the advantageous condition that the compression ratio is less than the expansion ratio is maintained throughout the load and speed range of the engine.

The combination also ensures that the exhaust gas driven pressure charger operates more effectively, in that it assists in the matching or balancing of the power given by the turbine with the power required by the compressor. The turbo-charger is thus enabled to operate under its most effective condition of delivering a given quantity of charge in the form of a relatively small volume at a relatively high pressure, and again this leads to the use of less than a cylinder volume of charge at relatively high pressure, in preference to a full cylinder volume of charge at relatively low pressure.

It will thus be seen that the timing of the orifices reduces the volume of charge retained in the cylinder thereby reducing the compression ratio and effective stroke and thus the relationship between them and the expansion ratio and stroke, the latter being unaltered; whilst the variation in the volume of the clearance space, varies both the expansion and compression ratios but not the strokes, and due to the difference in the effective volume of the two strokes, the compression ratio is varied by a lesser amount than the expansion ratio. At all part loads, where there is the greatest necessity for improved efficiency, the comparison and expansion ratios are increased as the load is decreased, to the control limit of maintaining the maximum combustion pressure substantially constant.

Tests have shown that as the degree of pressure charging is increased, the exhaust energy available, when the engine is running at full load, is greater than that required to compress the charge air to the pressure which, with a full utilization of the compression stroke, will give the permitted maximum cylinder pressure. The increase in the expansion ratio not only increases the engine output, but also reduces the temperature of the exhaust gases, which reduces the tendency of the pressure charger, when operating under full load conditions, to produce more air than is required to maintain the engine output.

The method has the further advantage that a given coolant in an after-cooler can extract more heat from the air charge by virtue of the higher temperature of the more highly compressed charge. Hence, with a given cylinder pressure at the end of the reduced effective compression stroke, the compression temperature is lower and a greater weight of air is present in the cylinder, so that a higher load can be carried before limiting engine temperatures are reached. Moreover, the compression work of the piston is further reduced. Alternatively a given degree of charge cooling may be obtained with a smaller after-cooler or a coolant at a higher temperature than would be necessary in the normal case. In order to recuperate more of the energy of the exhaust gases in the form of energy in the charge air, the efficiency of the turbo-charger compression process may be improved by the use of an after-cooler, or intercoolers between two or more stages of compression. Cooling of the charge can thus be termed a true second order element in the combination described.

The arrangements described may be applied to both four-stroke cycle and two-stroke cycle engines, as will be understood by those skilled in the art.

The accompanying drawings show, by way of example only, a number of embodiments of the invention in which.

Figure 9:
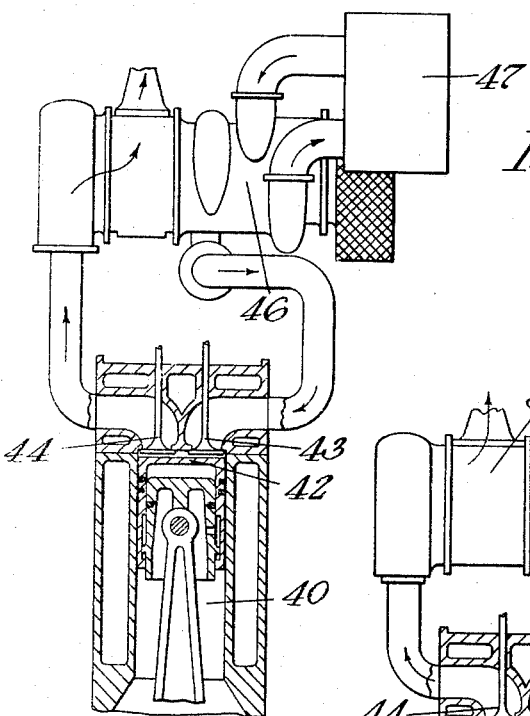
Figure 8:
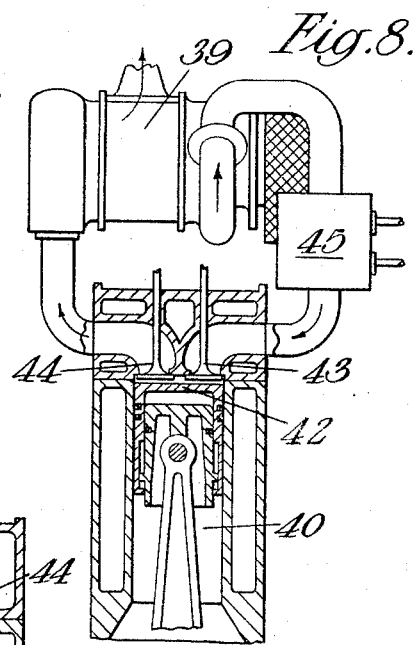
Figure 10:
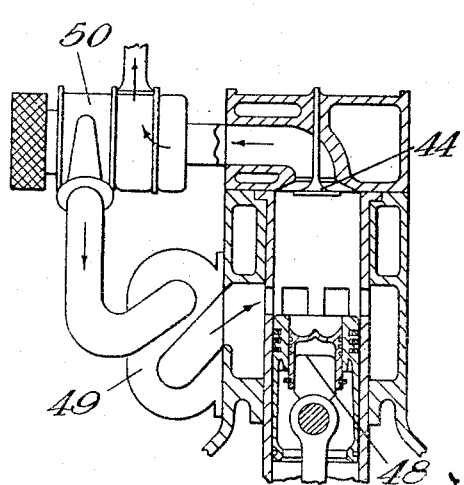
Figure 11:
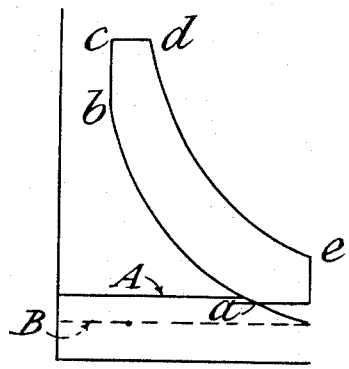
Figure 12:
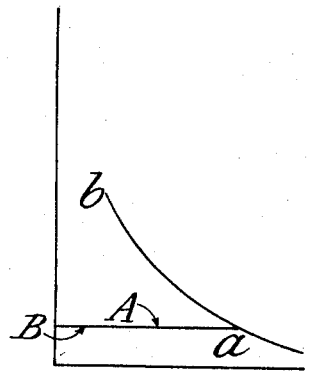
Figure 13:
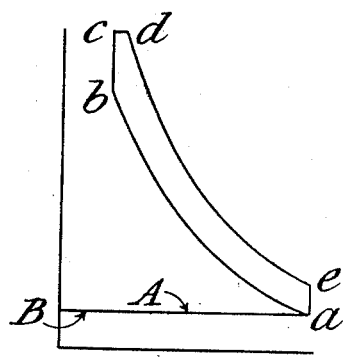
Figure 14:
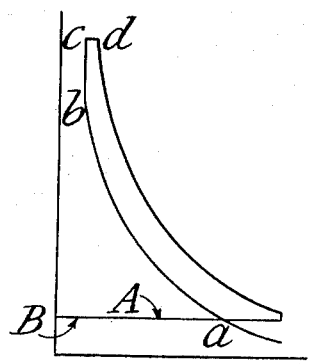

Figure 8 is a diagrammatic representation of a turbo-charged internal combustion engine having coolers between the charger and the engine cylinder, Figure 9 is a diagrammatic representation of a turbo-charged internal combustion engine having coolers between two stages of compression, Figure 10 is a diagrammatic representation of a turbo-charge internal combustion engine having a mechanically driven blower to assist the turbo-charger, Figure 11 is a diagram showing the relationship between pressure and volume of the charge in the cylinder of an engine in which the ratio $$\frac{\text{expansion ratio}}{\text{compression ratio}}$$

is substantially greater than 1,

Figure 12 is a diagram showing the relationship between pressure and volume of the charge during the compression stroke in the cylinder under starting conditions of an engine in which the ratio $$\frac{\text{expansion ratio}}{\text{compression ratio}}$$

is substantially greater than 1,

Figure 13 is a diagram showing the relationship between pressure and volume of the charge in the cylinder of an engine working with the normal cycle under starting conditions, Figure 14 is a diagram showing the relationship between pressure and volume of the charge in the cylinder of an engine working under starting conditions having the ratio $$\frac{\text{expansion ratio}}{\text{compression ratio}}$$

substantially greater than 1 and fitted with a variable ratio means.

Figure 1:
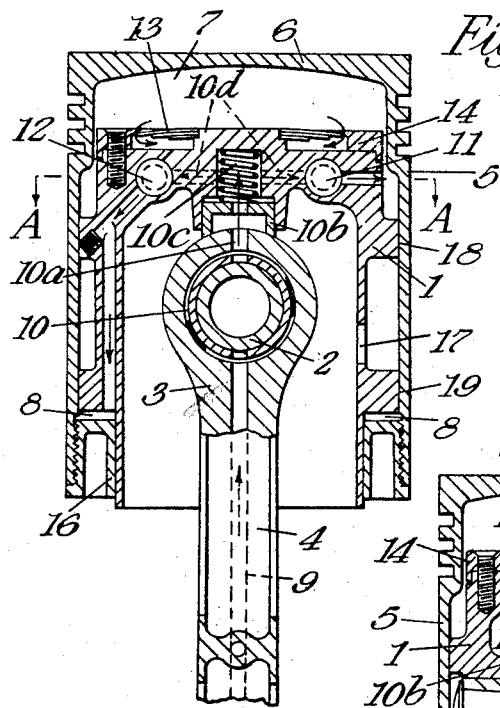
Figure 1 is a cross section of one form of piston.
Figure 2:
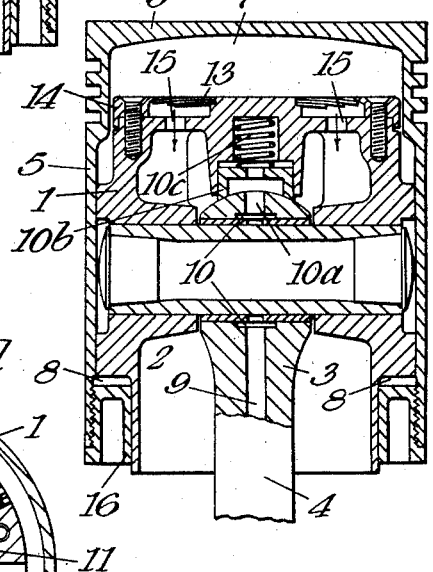
Figure 2 is a cross section of the same piston taken at right angles to that of Figure 1.
Figure 3:
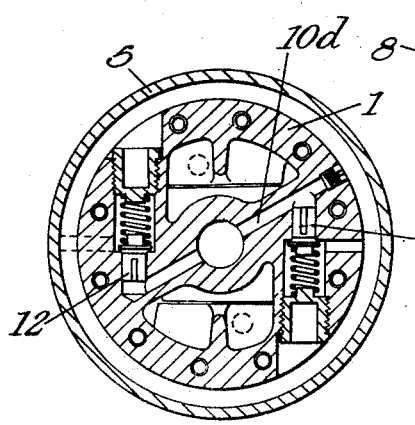
Figure 3 is a plan taken on the line A—A of Figure 1.

In one construction in accordance with the invention there is provided in each cylinder of an internal combustion engine of the four-stroke cycle type a piston as shown in Figures 1, 2 and 3 and formed in two main parts each of cup-like shape both having their open ends facing towards the crank shaft or other means of converting reciprocating motion into rotary motion, the one being positioned within the other. The upper end or crown 6 of the outer cup-like shaped member 5 forms the head of the piston proper and presents a surface of normal contours to the combustion chamber and is provided with piston rings in the normal positions, while the inner cup-like member 1 is slidable within and axially of the outer member. The inner member 1 is attached in the normal manner by means of a gudgeon pin 2 to the small end 3 of a connecting rod 4. The axial movement of the outer member in relation to the inner one effects changes in the clearance volume of the cylinder above the crown 6. A chamber 7 is formed between the upper surface of the inner member 1 and the lower surface of the crown 6 while a lower annular chamber 8 is formed by a rebate in the bottom of the wall of the inner cup-like shaped member, said lower chamber 8 being bounded on the inner and upper surfaces by the two surfaces of the rebate in the inner member while the outer surface of the same is formed by the inner surface of the skirt of the outer member while the lower surface is formed by an annular inwardly projecting ring 16 around the bottom of the skirt. This ring can be conveniently screw threaded to the bottom of the said skirt to allow of the introduction of the same after the inner member has been placed in position. The control of the movement between the inner and outer members is brought about by the flow of oil into and out of the upper chamber 7 and the lower annular chamber 8.

An oilway 9 is provided in the connecting rod 4 connecting the pressure lubricating oil supply to the small end bearing and thence by means of an annular passage 10 encircling the bearing sleeve to a hole 10a in the upper side of the small end of the rod. Alternatively, if the gudgeon pin is fixed in the small end and a bearing sleeve is not provided, the annular passage may encircle the pin or a hole may be provided through the pin. The outer periphery of this end of the connecting rod is formed part cylindrical or part spherical and has a hollow member 10b pressing thereon to form a seal around the hole. This hollow member is a sliding fit in a recess in the underside of the head of the inner cup-like shaped member and is urged to contact the end of the connecting rod at all times by a spring 10c. Alternatively, fixed mating surfaces may be provided with suitable clearances. The oil passes by way of an axial bore 10d in the hollow member to a non-return valve 11 from which it passes to the upper chamber. Oil also passes by way of another non-return valve 12 and passage to the lower chamber 8. To limit the pressure developed in the oil chambers by the inertia force of the oil in the connecting rod particularly at high engine speeds, the lift of the non-return valves may be limited or alternatively restricting orifices may be arranged at suitable points in the oil passages in the piston or connecting rod supplying the chambers.

The outer surface of the inner cup-like shaped member has an annular groove formed between the lower chamber and the head of the same thereby providing two lands 18 and 19 while a relief hole 17 is provided in the wall of the inner member to prevent a build-up of pressure by leakage of oil past the lands, which pressure would impose a load on the walls of both portions of the piston. When the walls of the inner and outer members can be made sufficiently strong to withstand this load, the relief hole and groove may be omitted in order to improve the sealing of both upper and lower oil chambers.

Figure 4:
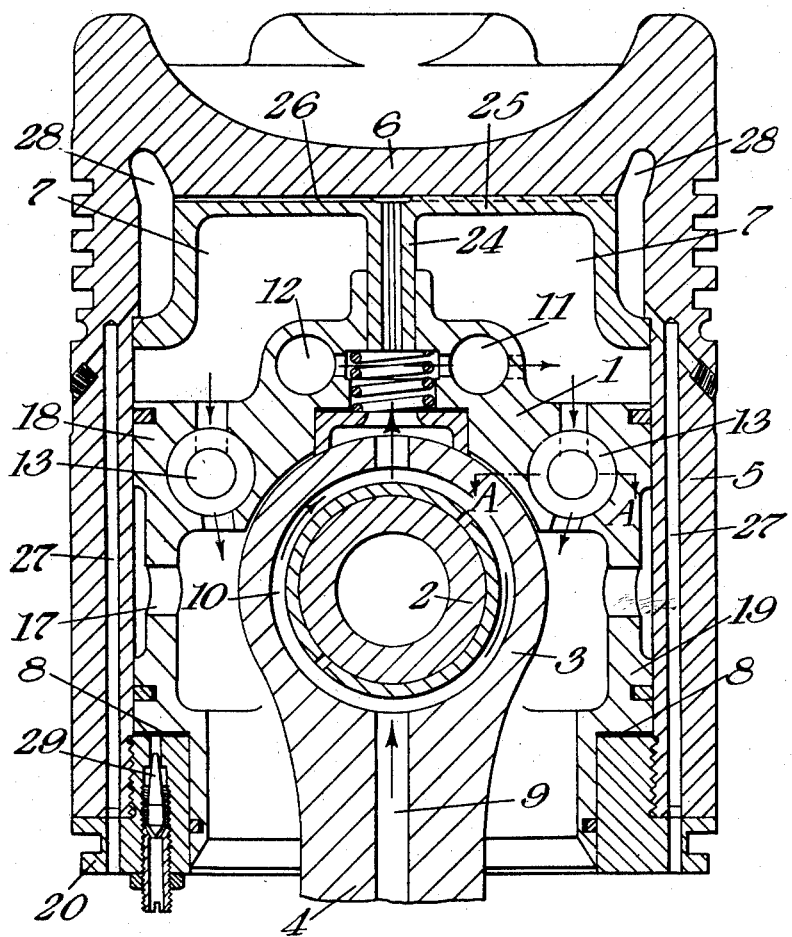
Figure 4 is a cross section of a still further form of piston.

Sealing rings may be used to close the leakage paths formed by the clearances between the inner and outer portions of the piston as shown in Figure 4.

Discharge of oil from the upper chamber takes place through a relief valve comprising laminated circular plates 13 of spring steel which may be of progressively decreasing diameter positioned coaxial with the inner cup-like shaped member 1 and forming part of the upper surface thereof. The uppermost circular plate bears around its periphery against a seating ring 14 and oil passing this valve drains via holes 15 to the engine sump. Discharge of oil from the lower chamber occurs downwards through the clearance between the inner member of the piston and the ring 16 forming the lower boundary of the lower oil chamber and upwards through the clearance between the inner and outer members of the piston. Alternatively discharge of oil through these paths is limited by making the clearances small and/or using sealing rings and the major part of the discharge occurs through an orifice discharging either downwards directly into the sump, or upwards and via a relief hole or holes in the inner part of the piston to the sump.

The action is as follows: During the latter part of each exhaust stroke and the first part of the induction stroke, the force due to the inertia of the outer member of the piston and the inertia of the oil in the upper chamber and to some extent the inertia of the column of oil in the connecting rod acts on the oil in the lower chamber, causing an amount to flow out through the discharge path and thus moving the outer part a very small distance (of the order of a few thousandths of an inch) upwards relative to the inner part. At the same time, the upper oil chamber increases in volume, and oil flows into it via the non-return valve 11. If the engine load has just been reduced, so that the maximum pressure is lower than that required to operate the relief valve, i.e. the condition under which an increase in compression ratio is required, this process is repeated on each engine cycle without other event until the compression ratio giving the pre-arranged maximum pressure which operates the relief valve is reached. The next small upward movement raises the compression ratio slightly above the required value and hence the maximum cylinder pressure slightly exceeds the value necessary to overcome the relief valve 13 which then opens and discharges a small amount of oil, thus bringing the outer portion of the piston down a small distance relative to the inner part. If the engine load now remains steady at the low value, the outer part of the piston continues to move up and down very slightly relatively to the inner part on each cycle, its mean relative position being that giving the value of maximum cylinder pressure determined by the relief valve opening pressure.

If the engine throttle is now opened, the cylinder pressure will tend to rise much above the value required to open the relief valve 13, but as this valve opens and provides a considerable discharge area, oil from the upper chamber 7 is rapidly discharged so that the outer portion of the piston moves down rapidly in relation to the inner part, and the clearance volume is increased thus maintaining the maximum cylinder pressure close to the pre-arranged value.

The piston thus adjusts itself at a limited rate to a reduction in engine load, this rate being determined by the area provided for leakage from the lower chamber. There is no need for a rapid increase in compression ratio and moreover a large relative upward movement of the outer part of the piston on each cycle would be undesirable since at constant load it would result in an equally large downward movement on each cycle, and hence an appreciable wastage of power in pumping oil. On the other hand, it is desirable that the piston should respond as rapidly as possible to a sudden increase in the rate of fuel supply to the engine in order to avoid excessive cylinder pressure and resultant detonation and/or high stresses. The rate of adjustment is determined by the relief valve 13. The above described arrangement giving a very rapid response by virtue of the large area uncovered at the periphery of a small movement, and freedom from differential effect, which makes some types of valve close at a pressure substantially lower than the opening pressure.

Until the designed minimum compression ratio is reached the portion of the piston subjected to the gas pressure is supported on oil in the top chamber 7 and therefore the gas pressure produces no bending stresses in the crown, which serves only to separate the gas and the oil. The crown has therefore to be designed to carry only its own inertia load and that of the oil, both of which will act on it toward the end of the exhaust stroke and during the first part of the induction stroke. When the designed minimum compression ratio is reached the inner surface of the head of the outer part of the piston rests on suitable surfaces provided on the top of the inner part of the piston.

Figure 5:
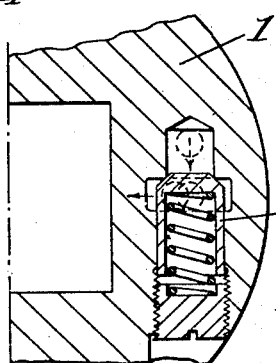
Figure 5 is a plan taken on the line A—A of Figure 4, and Figures 6 and 7 are cross sections of still further forms of piston.

Instead of the laminated relief valve 13, spring loaded valves of known type may be arranged through and around the head of the inner cup-like shaped member as shown in Figures 4 and 5 which discharge directly into the space inside the inner member 1 and thence to the engine sump. In Figure 4 the passage of cooling oil to the piston crown is by way of a hollow central stem 24 which is fixed at one end to the head of the outer member 5 and which slides in a bore in the inner member 1 and by which the oil is conveyed from the small end bearing 2 to radial passages 26 formed between the inner surface of the head 6 of the outer member 5 and a radially grooved plate 25 abutting thereon, the plate forming the upper boundary of the upper chamber 7. The radial cooling passages 26 discharge the oil into an annular space 28 in which the oil is shaken to and fro thus cooling the piston ring belt, after which it is discharged to the engine sump via passage 27.

In this design, as in the previous one, the piston crown is free of bending stress, the gas load being transmitted to the oil via the crown and oil passage plate, producing only compression in these members. Accordingly the piston crown may be thinner than in the normal design of piston, and a given flow of cooling oil is then more effective in maintaining acceptable temperatures at the combustion chamber surface of the piston crown.

An additional adjustable discharge orifice 29 may be provided to give additional area for leakage from the lower oil chamber, thus allowing adjustment of the rate of recovery of the piston on throwing off the load.

Figure 6:
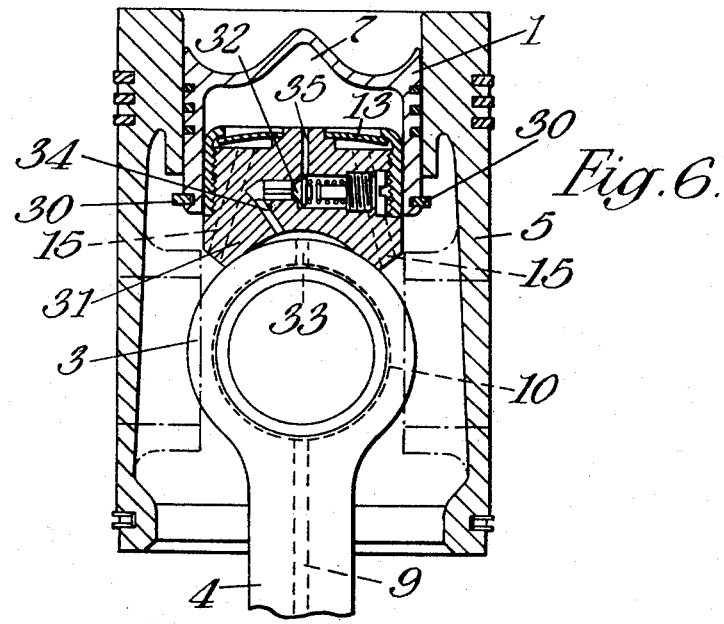

In a further construction for use in a two-stroke cycle compression ignition engine and shown in Figure 6, the outer portion 5 of the piston is formed as a cylinder having an axial bore in which the inner member 1 is axially slidable, resulting in changes of the clearance volume with changes of load. The movable part of the piston head comprises an inverted cup-like member 1 slidable in the bore of the cylindrical portion, being provided with a ring 30 sprung into a groove in the lower end of the skirt thereof which limits the extent of the upward movement thereof. The internal bore of the cup-like member has a third part 31 of cylindrical shape which is a sliding fit in the former and provides the lower boundary of the chamber 7 formed between its upper surface and the head of the movable part of the piston. This third part is machined on its lower face to form a bearing on the cylindrical or spherical outer surface of the small end of the connecting rod. This third part is provided with a disc-like relief valve 13 of the kind referred to in the first embodiment for discharging oil from the oil chamber 7 to the sump when the oil pressure exceeds a selected value, while a non-return valve 32 is provided between the oil chamber and the oil supply from the small end bearing.

In this application to a two-stroke cycle engine no lower oil chamber is required since the resultant of the gas and inertia forces acting on the cup-like member and the third part is always a force acting downwards. Downward movement of the cup-like member when the cylinder pressure rises above the limiting value is permitted, as in the previous cases, by the opening of the relief valve 13. Upward movement of the piston is effected by passage of oil under pressure via the non-return inlet valve 32 to the chamber 7. This can occur, with a normal lubrication system oil pressure, during the scavenging period, when the gas pressure is very small, since the inertia load of the cup-like member is small. The mass of the third part 31 is considerably greater but at low speeds this part may be lifted slightly thus allowing oil from the connecting rod to escape between the bearing surfaces on this part and the end of the connecting rod. This is not detrimental. An adjustable restricting device may be fitted to one or more of the oil supply passages 33, 34 or 35 to obtain suitable flow areas.

Thus the variation in compression ratio can be obtained without producing variations in the timing of ports controlled by the piston, but if it is desirable to vary the port timings in accordance with the compression ratio, the periphery of the piston crown may form part of the relatively movable portion of the piston.

Figure 7:
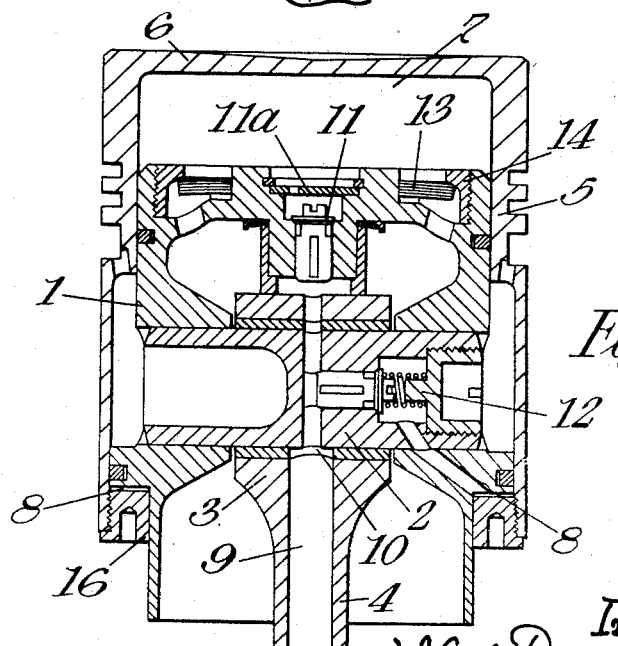

Figure 7 shows an arrangement in which the non-return valve 12 controlling the flow of oil to the bottom chamber 8 is provided inside the gudgeon pin 2, while the flow of oil to the upper chamber 7 is by way of the non-return valve 11 and the restricted orifice in the plate 11a to limit the flow of oil to the upper chamber, otherwise the arrangement is normal and operates in the manner previously described in reference to Figures 1, 2 and 3.

Alternatively, substantially the same result may be obtained by making the length of the connecting rod variable, the necessary oil chamber or chambers being provided with the associated non-return and relief valves as required.

Figure 8 shows, by way of example, a diagrammatic lay-out of an engine having a turbo-charger 39, and variable ratio means comprising the piston 41 with movable head 42 which ensures that the maximum cylinder pressure is maintained at a predetermined high value even at the lightest loads. The required reduction in the effective compression stroke is obtained by suitable arrangement of the timing of the inlet 43 and/or exhaust valve 44 in the manner previously described, while the engine is provided with a cooler 45 between the charger 39 and the engine cylinder.

Figure 9 shows, by way of example, a diagrammatic lay-out of an engine similar to that of Figure 8 in which the charger 46 has two stages and the cooler 47 is provided between the stages.

The proposed charging system when applied to the two-stroke cycle engine gives the same advantages as when applied to the four-stroke cycle engine, that is, high efficiency at light loads and good starting without the need to alter the valve timing. The increase in efficiency has the effect of lowering the exhaust temperature and pressure and this in turn reduces the output of the turbo-charger. In some cases at light loads the turbo-charger output will not be sufficient to scavenge the engine cylinder effectively, and in these cases a mechanically driven compressor may be added to run in series or in parallel with the turbo-charger. Figure 10 shows a diagrammatic lay-out of a two-stroke cycle engine in which the ratio $$\frac{\text{expansion ratio}}{\text{compression ratio}}$$

is substantially greater than 1, fitted with a variable ratio piston 48 and having a mechanically driven blower 49 running in series with a turbo-charger 50

The relationships between the pressure and the volume of working fluid during the engine cycle for various operating conditions are shown in Figures 11 to 14. Figure 11 shows an advantageous shape of diagram for full load operating the engine in which the expansion stroke is greater than the compression stroke, this is obtained by setting the valve timing so that the pressure in the cylinder does not rise appreciably above the turbo-charger delivery pressure A until the piston has moved to point $a$ in the compression stroke where the remaining stroke $a$, $b$ is appreciably less than the expansion stroke $c$ and $e$. A bad feature of running an engine with this timing is that when starting the turbo-charger delivery pressure A is close to atmospheric pressure B and the pressure in the cylinder at $a$ is correspondingly low as shown in Figure 12 with the result that the compression from $a$ to $b$ is not sufficient to raise the air temperature sufficiently to ensure ignition of the fuel. A known method of overcoming this fault is to vary the valve timing of the engine so that the compression stroke is increased up to that of the expansion stroke for starting and light load running. The pressure volume diagram then becomes normal as shown in Figure 13. The advantageous condition of $$\frac{\text{expansion ratio}}{\text{compression ratio}} > 1$$

is lost.

With the proposed system in which the engine is fitted with a device capable of varying the clearance volume of the engine good starting and light load running are obtained without recourse to variable valve timing and without the loss of the high efficiency feature $$\frac{\text{expansion ratio}}{\text{compression ratio}}$$

greater than 1. Figure 14 shows the relationship between the pressure and volume of the charge during starting and light load conditions with this arrangement.

Compression again commences from near atmospheric pressure at point $a$ after the piston has performed a considerable part of its stroke, but by virtue of the reduced clearance volume the full compression temperature and pressure are obtained and combustion is followed by expansion through a very large ratio. The required variation in the clearance volume can be achieved by the use of the variable ratio means described in Figures 1 to 7 inclusive.

It is to be understood that the various embodiments above described are by way of example only and that details for carrying the invention into effect may be varied without departing from the scope of the invention.

I claim:
1. An internal combustion engine comprising a cylinder, a piston in said cylinder, inlet and outlet orifices in the cylinder for the entry and exit of gases into and out of the cylinder, and in combination an exhaust gas driven pressure charger that delivers charge to the cylinder at a pressure and in a quantity per cycle which is dependent upon the load and speed of the engine, controlling members adapted to open and close the said orifices at non-varying points in the cycle of operations, which ensure that the volume of charge at substantially the pressure of supply which is present in the cylinder when all the orifices are closed is substantially constant and is considerably less than the total volume of the cylinder, such that the effective volumetric compression ratio and effective compression stroke are considerably less than the volumetric expansion ratio and the expansion stroke respectively, the effective compression stroke and the expansion stroke being substantially constant, means for varying the volume of the clearance space in the cylinder directly in accordance with variations in the maxi- mum gas pressure in the cylinder in order to maintain the latter substantially constant over a wide load and speed range of the engine for automatically varying the compression and expansion ratios, said combination giving the result that for every variation of load and speed the compression ratio is varied by a lesser amount than the expansion ratio while the compression ratio and effective stroke are maintained less than the expansion ratio and stroke.

2. An internal combustion engine as in claim 1 in which the amount by which the volume of charge present in the cylinder when all the orifices are closed is less than the total volume of the cylinder, the variation in the volume of the clearance space, the variation in the compression and expansion ratios, and the variation in the relative values of the volumetric compression ratio and compression stroke to the volumetric expansion ratio and expansion stroke, respectively, are all greater than is possible by the separate employment of the same individual features.

3. An internal combustion engine as in claim 1 further including means for cooling the charge after compression by said charging means and before passing the charge into the cylinder.

References Cited in the file of this patent
UNITED STATES PATENTS

| | | | |
|---|---|---|---|
| 752,936 | Vogt | Feb. 23, | 1904 |
| 1,046,738 | Cross | Dec. 10, | 1912 |
| 1,160,419 | Lawrence | Nov. 16, | 1915 |
| 1,384,133 | Howe | July 12, | 1921 |
| 1,637,245 | Scully | July 26, | 1927 |
| 1,926,598 | Peterson | Sept. 12, | 1933 |
| 2,104,802 | Hansen | Jan. 11, | 1938 |
| 2,248,323 | Anthony | July 8, | 1941 |
| 2,559,623 | Holmes | July 10, | 1951 |
| 2,573,688 | Butler | Nov. 6, | 1951 |
| 2,573,689 | Butler | Nov. 6, | 1951 |
| 2,622,390 | Newton | Dec. 23, | 1952 |
| 2,670,594 | Crooks | Mar. 2, | 1954 |
| 2,670,595 | Miller | Mar. 2, | 1954 |
| 2,742,027 | Mansfield | Apr. 17, | 1956 |
| 2,780,912 | Miller | Feb. 12, | 1957 |